United States Patent [19]

Scalise et al.

[11] Patent Number: 5,459,519
[45] Date of Patent: Oct. 17, 1995

[54] VIDEO IMAGES DECODER ARCHITECTURE FOR IMPLEMENTING A 40 MS PROCESSING ALGORITHM IN HIGH DEFINITION TELEVISION

[75] Inventors: Fabio Scalise; Rinaldo Poluzzi, both of Milan, Italy

[73] Assignee: SCS Thompson Microelectronics, S.r.l., Milan, Italy

[21] Appl. No.: 241,604

[22] Filed: May 11, 1994

[30] Foreign Application Priority Data

May 26, 1993 [EP] European Pat. Off. .............. 93830228

[51] Int. Cl.⁶ .................................................... H04N 7/01
[52] U.S. Cl. ........................... 348/431; 348/443; 348/489
[58] Field of Search ....................................... 348/426, 427, 348/430, 431, 443, 489, 441; H04N 7/01, 7/12

[56] References Cited

U.S. PATENT DOCUMENTS

| | | | |
|---|---|---|---|
| 4,864,398 | 9/1989 | Avis | 348/443 |
| 5,113,242 | 5/1992 | Tsinberg et al. | 348/489 |
| 5,138,448 | 8/1992 | Gillies et al. | 348/443 |
| 5,168,358 | 12/1992 | Ishizu et al. | 348/443 |

FOREIGN PATENT DOCUMENTS

| | | | |
|---|---|---|---|
| 0424269 | 4/1991 | European Pat. Off. | H04N 7/00 |
| 0428216 | 5/1991 | European Pat. Off. | H04N 7/00 |
| WO91/12691 | 8/1991 | WIPO | H04N 7/00 |

*Primary Examiner*—Victor R. Kostak
*Attorney, Agent, or Firm*—Wolf, Greenfield & Sacks

[57] ABSTRACT

A video image decoder architecture for implementing a processing algorithm in the 40-ms mode on high-resolution TV sets, of a kind adapted to handle TV signals being received on respective transmission channels (J,L), which comprises a video signal demultiplexer receiving the transmission channels (J,L); and respective processing blocks for separately handling the signals from each of the channels (J,L). Each processing block includes a video image format converter, a local memory connected to an output of the converter, and at least one median filter and one systolic filter cascade connected after the memory for restoring, by interpolation, signal samples related to successive lines of the video image. A summing node adds the outputs from each processing block so as to obtain a time mean between restored samples of the channels (J,L). This architecture drastically reduces the number of memories required for processing the restored algorithm, as well as reducing overall silicon area requirements for the system. Accordingly, the whole 40-millisecond processing portion may be integrated into a single chip.

28 Claims, 14 Drawing Sheets

VIDEO IMAGES DECODER ARCHITECTURE FOR IMPLEMENTING A 40 MS PROCESSING ALGORITHM IN HIGH DEFINITION TELEVISION

BACKGROUND OF THE INVENTION

1. Field of the Invention

This invention relates to a hardware architecture for implementing a restitution algorithm of a TV picture in the "40-millisecond" mode, within a decoder of a HD MAC (High Definition Television Multiplexing Analog Component) system for handling a high-resolution TV signal (HDTV).

2. Discussion of the Related Art

As is well known, high-resolution television (HDTV) presently constitutes one of the most technologically challenging applications in the electronic field. This is primarily attributed to the market potential of electronic equipment directly or indirectly associated with that kind of television. The market potential is so vast that it has become of primary interest to any of the industries involved in consumer electronics. Within this frame, considerable effort has been paid by the relevant industry for offering products of ever improving quality to an ever more comprehensive public.

In the HDTV field, a combination of the principal European manufacturers have proposed a standard called "High Definition Multiplexing Analog Component" (HDMAC) which provides the transmission of TV pictures with a resolution twice as high both horizontally and vertically, and in analog form. (This standard will be called "algorithm" hereinafter, without the term implying that processor programs are the only way of implementing the standard.) The HDMAC algorithm is format compatible with existing TV receivers preset for a low-resolution standard TV signal.

The algorithm provides some image pre-processing steps before transmission, so that an image to be transmitted is in a compatible format with that of low-resolution TV. Likewise, receiver sets should be capable of so processing the received image to restore it to its original format.

For a clearer appreciation of the invention, a brief description of the HD (High Definition) image format in the HDMAC system follows. The image picked up by a TV camera is formed of 1250 lines (of which only 1152 are active) and transmitted in interlaced fashion at a half-frame frequency of 50 Hz and a line sampling frequency of 54 MHz, which gives 1728 samples per line (of which only 1440 are active). On the other hand, the standard-resolution image format consists of half as many lines (625) and half as many samples per line (864); additionally, the sampling frequency is 27 MHz. Accordingly, the line period will be of 64 μs.

Thus, to reduce the format of the HD image to that of standard definition, the number of samples transmitted must be reduced to one fourth of the number of the original picture samples. In other words, in the HDMAC system, the high-resolution image is subsampled by a factor of 4:1 at coding level, so that it can be transmitted within the band of the transmission channels normally used for the standard TV format. The application of that sample selection method (subsampling) also requires that the type of the image being currently handled be taken into account.

As such, images are classified according to their motion contents with respect to a preceding image, and at three different levels with which a number of subsampling grid patterns are associated. Specifically, they are called "stationary," "slow-motion" images, or "fast-motion" images.

In practice, the number of samples transmitted would remain constant between the modes, whereas the locations of the samples selected from the HD image would change. Accordingly, in that portion of the system which is to prepare the images for transmission, i.e., within the encoder, an image motion contents estimating block is provided which can decide on the subsampling mode for the current image.

It should be added that the motion estimate, and hence the subsampling decision, is performed on a block of 16×16 samples for the HD image. Consequently, each image will be divided into 6490 blocks, each to be coded separately (except for certain adjacency limitations which restrict the freedom of choice in the coding of clock sequences).

The three subsampling modes previously outlined are termed "20-millisecond," "40-millisecond," and "80-millisecond" mode, according to the time period required by the system to construct the subsampling grid pattern. FIG. 1 of the accompanying drawings shows the three grid patterns which correspond to the aforesaid three sampling modes.

As already mentioned, a reverse operation is to be carried out at the receiver so as to restore the missing samples on the HD image so as to obtain the image with its original resolution before it is conveyed to the display. Usually, the decoder restores the image to its full format by using median filter-based non-linear interpolation techniques.

More particularly, the missing samples are restored by interpolating a given number of nearby samples through a so-called working window. In switching from one mode to another, the basic structure of the working window does not change, but expands according to the density of the samples present on the grid pattern.

FIG. 2 shows three interpolation windows for luminance in the three different modes mentioned above. Similar considerations would apply to color samples, i.e., to chrominance.

FIG. 3 shows in greater detail the interpolation window for the 40 ms mode. The interpolation function currently used in the HDMAC system can be analyzed with reference to that FIG. For example, to interpolate coordinates e8 the following linear formula may be used:

$$e8 = 0.5*mf(B) - 0.25*mf(A) - 0.25*mf(C) + 0.125*e1 + 0.375e7 + 0.375e9 + 0.125e11.$$

Since three terms of the weighted sum are not available (i.e., e6, e8, e10, the second of which is the same pixel to be interpolated), such terms must be obtained from actually available samples. To obtain these values, a left-hand three-point median filter is used, as shown in the Figure at A, B, C. In essence, the three missing terms of the sum are substituted by the results of the filtering operation as carried out by three median filter: A replacing e6, B replacing e8, and C replacing e10.

A median filter on N samples will give in return a sample of "median" value from the N values subjected to filtering. For example, the median filter result of the values 10, 23, and 124 is 23, while that of the values 1, 120, and 122 is 120.

At the end of this step, all of the image odd line samples, that is, the whole odd filed of the interlaced signal, will have been restored. This is so because on the subsampling grid pattern for the "40-millisecond" mode only samples from the odd field of the HD picture are present, as can be deduced from FIG. 1.

However, the even lines must also be restored if the HD image is to be brought back to its original resolution. If the "80-millisecond" mode was considered, the grid patterns would have contained the samples from both image fields, and all the lines would have been restored at the end of the interpolation step. On the other hand, in the 20-millisecond mode, the pixels still missing would be obtained form the mean of two adjacent samples in the same line, an original sample and an interpolated one.

Thus, the 40-millisecond mode appears to be the only one that is still incomplete after the preceding interpolation step. That coding mode is, therefore, the most demanding from the computational standpoint, because it must include a further linear time interpolation step to accommodate the motion contents of the image.

The second portion of the algorithm in the 40-millisecond mode provides a time mean of samples from two successive in time odd fields restored in the first step. FIG. 4 illustrates diagramatically this kind of time interpolation.

It should be particularly noted that a simple homogeneous mean, that is, one involving samples at the same locations but in two odd field (J and L), would have a deleterious effect on the sequence of pictures that are presented on the display, since the time correlation of the two odd fields is insufficiently high. A low correlation is due to the presence of a certain motion rate in the image, resulting in limited correlation of the two time mean elements at homolog locations. It is for this reason that the motion contents should be taken into account when selecting the samples to be used for the time averaging operation.

In this respect, some control data, generated by a motion estimator that is incorporated in the encoder, is usually utilized. This data is referred to as "motion vector." The term "vector" is indicative of vectorial information that describes the direction of movement of the generic block. Shown in FIG. 4 are two components of the motion vector, which are symmetrical with respect to the two fields J and L.

The time interpolation allows the even field of the image to be satisfactorily generated in the 40-millisecond mode, as shown, thereby enabling the image to be displayed with its original resolution.

The non-linear interpolation based on the median filter, and the linear one based on the image motion estimate, operate on a pixel sequence in the raster format. As such, line memories (LMs) must be used for each time that an interpolation step is effected because the working window generally encompasses several successive lines of the image. In addition, since the two interpolations are independently performed in succession the need for an increased number of line memories becomes apparent.

A prior art embodiment of a TV signal decoder, for high-resolution receivers, was developed by Thomson TCE in 1989, and will be discussed hereinafter for later comparison to this invention.

FIG. 5 is a schematic block diagram of the architecture 50 of that decoder operated in the 40-millisecond mode for defining luminance. A first block 51 performs a non-linear filtering using a median filter whereby the signal's horizontal resolution can be doubled. This block 51 receives input samples pertaining to a special grid pattern of the 40-millisecond mode, as already set forth. Each decoder in the chain is split into portions 51 and 61, whereby it can receive and manage in parallel, two successive odd-field channels J, L as required to accommodate the motion. The working frequency is 27 MHz.

Shown diagramatically in FIG. 6 is the inner structure of one of the non-linear interpolators 51 and 61. At the input of each block, two line memories 53, 54 receive samples from three successive line of a subsampling grid 45 (FIG. 7) e.g., three samples "A" in FIG. 3. These samples are then available for a successive block 55, which performs a three-point median filtering.

A selector 56 is provided on a central leg 58 of the filtering block 51 or 61 to drive the introduction of a sampling time lag FF. This is necessary when moving from a working window 60 (FIG. 6A) centered on odd lines (a, e) to a window centered on even lines (c, g) of the odd field (J or L).

In fact, the odd lines of an odd field (a, e) on the grid pattern only contain odd samples, whereas the even lines of the odd field (e, g) contain just even samples.

With reference to FIG. 3, the three samples "A" will come in simultaneously from three respective line memories 54, whereas in the dual interpolation processing instance described below, the central sample (e5) will come in a clock time in advance of the other two and must be retarded by a factor FF 56A, as shown in FIG. 6. A signal LT is expressly provided for controlling the selector 56 so as to obtain line parity in the odd field. The selector is to switch over at the start of a new grid line, that is, every 64 μs.

At the output of the median filter 55, there is a network 57 composed of sample retarding elements FF (clock period at 27 MHz, i.e., 37 ns) and adders (+) which allow a linear interpolation function to be implemented which comprises seven elements and provides a so-called non-linear interpolation working window.

In addition, between the selector 56 and the median filter block 55, there is extracted an original sample from the subsampling grid pattern to be output along with the interpolated sample.

Thus, at each clock period, two samples will be output for each new sample input: the original and the interpolated samples. In this way, the horizontal resolution is redoubled.

Two selectors, not shown for clarity because they are conventional, are connected at the two outputs and allow the samples to be addressed, in accordance with the line parity in the odd field, such that the even samples will appear at a first output 49 and the odd samples at a second output 59 (FIG. 5). This separation is necessary to maintain a working frequency of 27 MHz on the connecting buses. The above signal LT is adequate to control these two selectors as well. At this point, the image odd fields will have been fully restored, as is apparent from FIG. 7.

To complete the restitution in the even fields of the image, a time mean of the fields J and L is now needed, with the so-called motion vectors 47 also in mind. To this aim, a buffer storage structure 67 is used which comprises RAM stores 46, as shown in FIG. 5. The structure 67 has at least four connection routes between the interpolators 51, 61 and the memories 46, two for the odd line samples of the odd field and two for the even line samples. Such connection routes relate to the two fields (J and L), and each supply a structure 70 shown in FIG. 8. A shift register (SR8) 40 functions to assemble the samples into sets of eight within storage words of sixty four bits, which words are alternately written to two RAM stores 46 via a selector 44. The samples are led one at a time to the serial input of the shift register 40, and a word of sixty four bits is written to the memory every eight oncoming samples. The capacity of each memory is of 540 words, that is, five lines of 864 samples, each sample being eight bits. As a result, the memory write rate will be of 1.6875 MHz (i.e. 27/16 MHz).

Two double paris 63, 64 of shift registers are provided at the output of each memory 46 to receive two words of sixty four bits obtained from each memory by a read operation. The second register 65 of each pair 63 or 64 allows the sample to be shifted to the serial output of the other shift register. This enables the eight samples of a current word to be pipelined with those of a previously read word.

After the register pairs 63, 64, a cascade of FF sample retarding elements 66 is provided which has varying length. Each series is controlled by the horizontal component of the motion vector, thereby selecting the horizontal offset required for accommodating the motion.

The vertical component of the motion vector is used to set the memory address of the sixty four-bit word for a read operation. Thus, at each clock period, four different samples will be available at the output of each memory.

FIG. 9 enables this feature to be better appreciated by comparison to FIG. 4. It can be seen that since the even lines of J and L (lines b, d, f) are absent, a further interpolation operation is needed to determine when the value of the motion vector requires a sample from the missing field, namely a sample of the horizontal component of the motion vector, in this case equal to 2. This further interpolation is performed on four samples made available from the memory, all in the same column. Conversely, where the sample is actually present, e.g., in the instance of the vertical component of the motion vector being an odd value, it will be sufficient that the sample be sent on the four outputs to cancel the effect of the vertical interpolation weighted sum (in fact, the sum of the weights would be 1). FIG. 10 completes the structure of the decoder architecture operating in accordance with the prior art. The block 75 shown therein implements the time mean of the two fields J and L to generate an intermediate field (designated K). This structure is repeated for the even samples.

The four inputs to the block 75 (even and odd ones for J and L) are first multiplied by a selectable coefficient (0.5 or 1 for J, and 0.5 or 0 for L), and then conveyed as appropriate to an adder 69 which will output the samples.

The selection of the multiplier coefficients is carried out with field periodicity (51 Hz) by a signal FP enabling the time mean to be executed with coefficients 0.5, where an even field is to be produced, or with coefficients 1 for J and 0 for L, where an odd field is to be produced. The latter case is the same as performing no mean.

Shown in FIG. 11 are by comparison the patterns versus time of the two timing signals LT and FP used in the system.

The foregoing discussion was offered to broadly define the function of the coding and decoding algorithm in the HD-MAC system.

SUMMARY OF THE INVENTION

This invention concerns a novel architecture for implementing a critical portion of a HDMAC receiver. In particular, it specifically concerns the processing channel for the luminance component of the "40-millisecond mode". A preferred embodiment affords considerable savings in terms of hardware silicon area and optimization of the critical portions of the decoding algorithm.

An object of the invention is to provide a decoder architecture for incorporation into a high-resolution TV receiver, which has such structural and functional features that it enables efficient handling of the restitution algorithm of a 40-millisecond mode TV image, while overcoming the limitations of prior art approaches.

The decoder architecture of a preferred embodiment of the invention includes a video signal demultiplexer that receives a transmitted TV signal. The TV signal is separated into two fields with each field transmitted to a corresponding processing block. Each processing block includes a video image format converter, a local memory connected to the converter, and a median filter and a systolic filter connected in cascade after the memory. A summing node adds the output of each processing block so as to obtain a time mean of each of the fields of the TV signal. The median filter and systolic filter conjointly perform interpolation and motion compensation.

The features and advantages of the invention will become apparent from the following description of an embodiment thereof, given by way of example and not of limitation with reference to the accompanying drawings.

DETAILED DESCRIPTION

Figure 12:
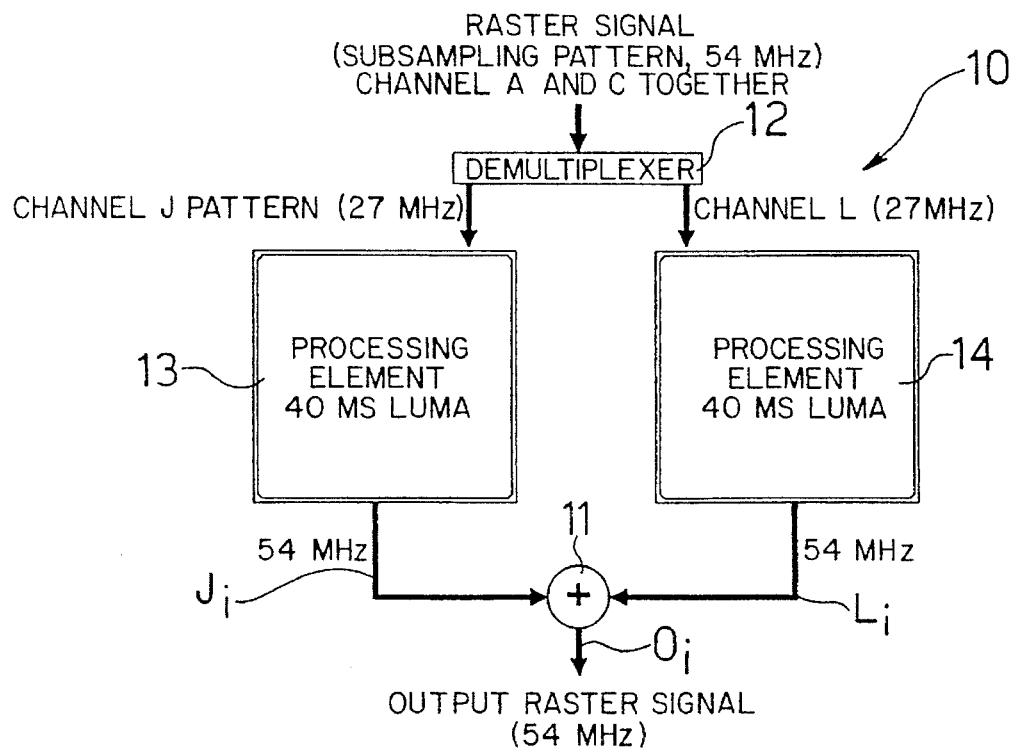
FIG. 12 is a diagramatic view of the decoder architecture according to this invention.

Referring to FIG. 12, item 10 denotes an image decoder architecture of a preferred embodiment of this invention, for implementing a processing algorithm in the 40 ms mode with high-resolution TV sets. In this architecture 10, the maximum working frequency is 54 MHz, rather than 27 MHz as in the prior art.

A major consequence of this choice is that the original 27 MHz channels of the prior architecture (Thomson TCE) can be addressed on a single bus at the 54 MHz frequency.

The first block in the structure 10 is a demultiplexer 12, separating the two original channels J and L and conveying them to two identical sub-blocks 13 and 14. The processing that is carried out in each channel is, therefore, identical.

The two split channels supply the two processing blocks 13 and 14, which will output the two respective sample sequences Ji, Li as restored by a median filter non-linear interpolation and a compensation for motion. Such output sequences are added together at a mode 11, thereby obtaining the time mean of J and L and outputting the final samples Oi in the 40-millisecond mode.

Figure 13:
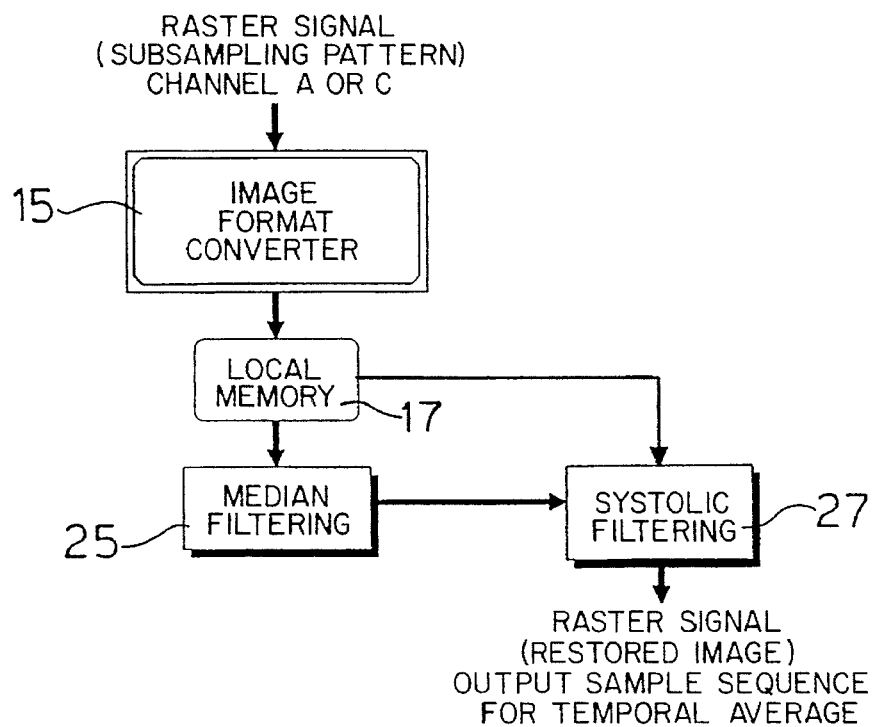
FIG. 13 is a more detailed diagramatic view of the architecture in FIG. 12.
Figure 14:
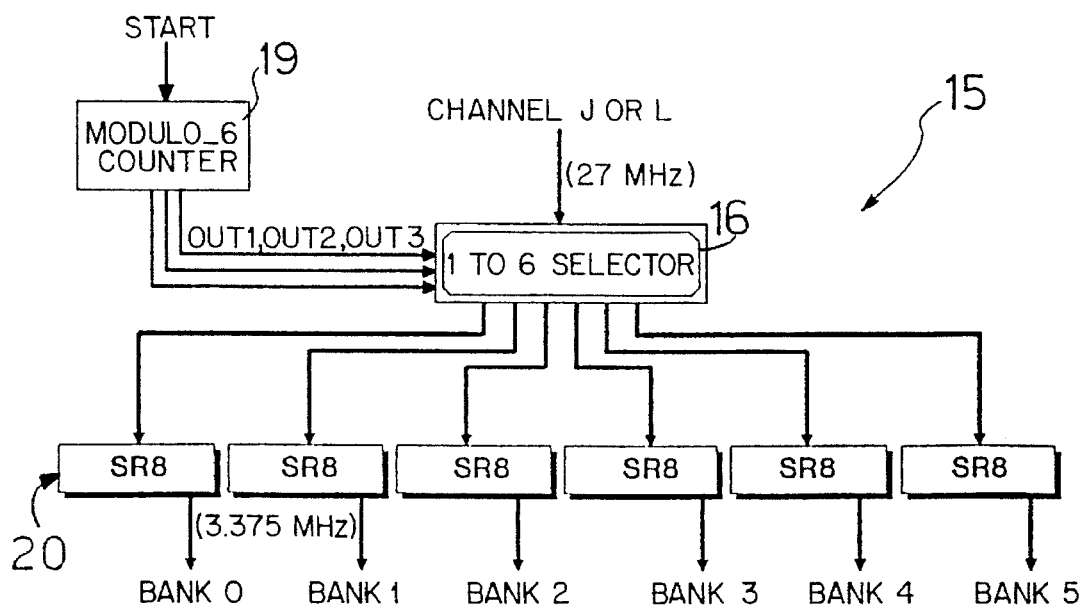
FIGS. 14 and 15 are diagramatic views of details of the architecture in FIG. 12.
Figure 15:
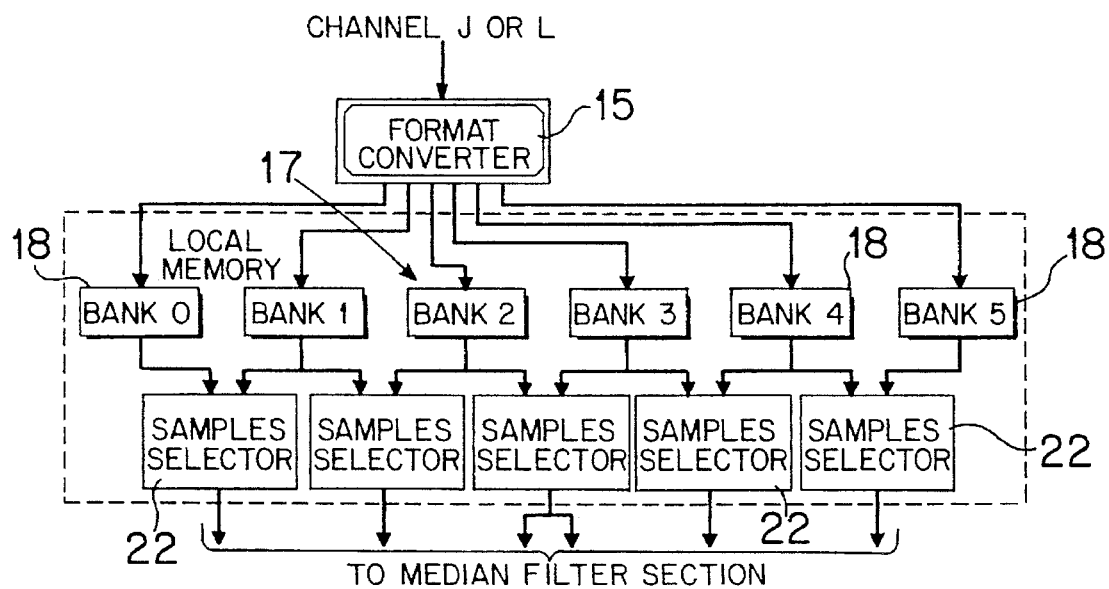

FIGS. 13–15 illustrate the internal structure of each processing block 13 or 14 for handling each of the two input channels. A format converter 15 is provided at the input of each block, which consists of a register SR8 selector (demultiplexer) 16 (FIG. 14) having at least six outputs and capable of supplying six banks 18 (FIG. 15) of a local memory 17 after one another with samples from the input of the respective block 13 or 14. Each bank 18 shift occurs concurrently with a video line shift, so as to store into a given bank 18 all the samples of a certain video line. The word length of each storage bank 18 is of sixty four bits (eight contiguous samples of eight bits each) and the capacity of each bank 18 is of 180 words, i.e., two active video lines of 720 eight-bit samples (namely, 11,520 bits per bank). Based on the word length selected and because of the supply bus being formed by eight bits, it becomes necessary to use a shift register 20 (FIG. 14) comprising eight cells SR8 of eight bits each and capable of performing the series/parallel conversion at the input of the memory 17. A hardware schematic for the format converter 15 is shown in FIG. 14.

The overall capacity of the local memory 17 (combined channels J and L) is of twelve banks, which is the equivalent of 2140 sixty four-bit words (i.e. 138,240 bits). The memory write rate is 3.375 MHz, due to the selected word structure and the division into banks, which corresponds to an available time for write access of more than 290 nanoseconds during the active period of a given bank 18. Bank selection of the various banks 18 is driven through a modulo-six counter 19 (FIG. 14) which is incremented by shifts of a signal LT (not shown, but previously described).

FIG. 15 illustrates the various banks 18 of the memory 17. Each memory bank 18 is actually set up with two dual port RAM stores which allow concurrent read and write operations, though not at the same memory address. Both stores of each bank have a capacity of ninety words, and are used for writing in an alternate manner (interleaving), so that nearly twice the time (approximately 510 nanoseconds) becomes available for accessing the RAM store. Advantageously, one RAM store contains the odd-located samples on a given video line, and the other contains the even-located samples. While the memory bank write operations is characterized by a low rate (3.375 MHz), the data read operation should be carried out at a suitable clock frequency to ensure updating of the available data at each clock period (54 MHz).

Thus, by utilizing the possibility of accessing two contiguous words from two different stores (i.e., in parallel), as many as sixteen samples can be made available at the output of each bank 18 with a single read cycle. This allows these sixteen samples to be updated by a refresh every 288 nanoseconds, that is, at every change in value of a motion vector.

The bank address and word address within the bank are determined from the vertical component 29 (FIG. 17) of the motion vector. A part of the bank 18 enable feature that prevailed during the write operation is therefore lost (polling).

Figure 16:
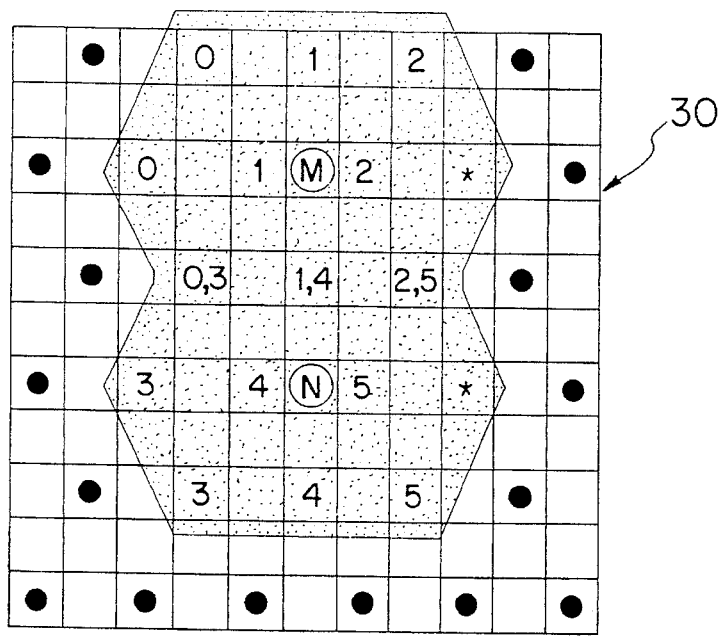
FIGS. 16, 17, 19 and 19a are diagramatic views of so-called interpolation windows of the restitution algorithm processed by the architecture according to the invention.

With the channel structure comprising six banks 18 of two video lines each, any of the eight-sample blocks can be addressed from six different contiguous video lines at one time, and these six contiguous lines can be selected on a window 30 of twelve successive lines (FIG. 16). This faculty allows samples Ji, Li to be output from the memory 17 as required to construct the so-called working window 30 (FIG. 16) for the median filter section 25 which comes after this local memory section 17 (See FIG. 13).

Referring to FIG. 15, at the output of the memory 17 are selectors 22 which will route five out of the six selected blocks in the order required by the working window of the median filters 25 (See FIG. 13). The working window 30 for the subject mode is shown in FIG. 16.

Figure 1:
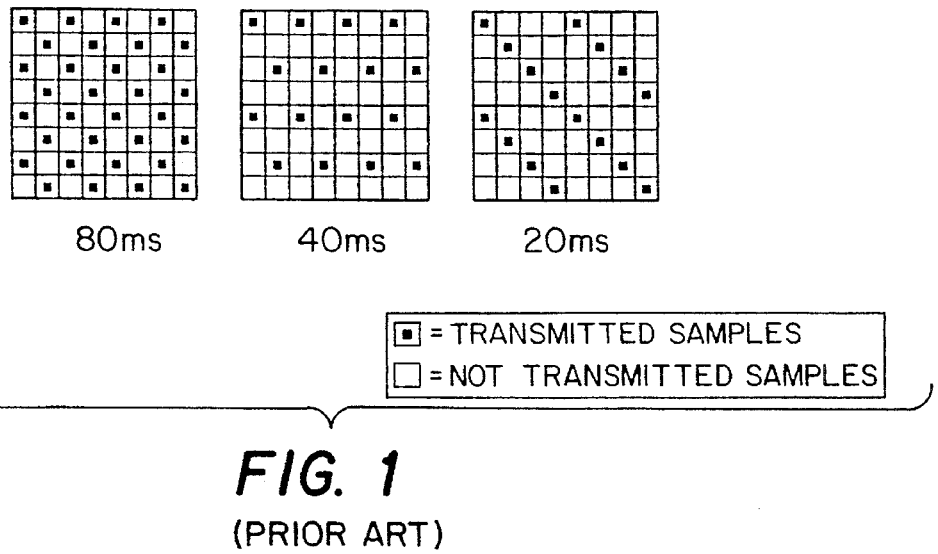
FIGS. 1 to 4 in the drawing, are schematic charts of processing steps of a restitution algorithm of a TV image operating according to the prior art.
Figure 2:
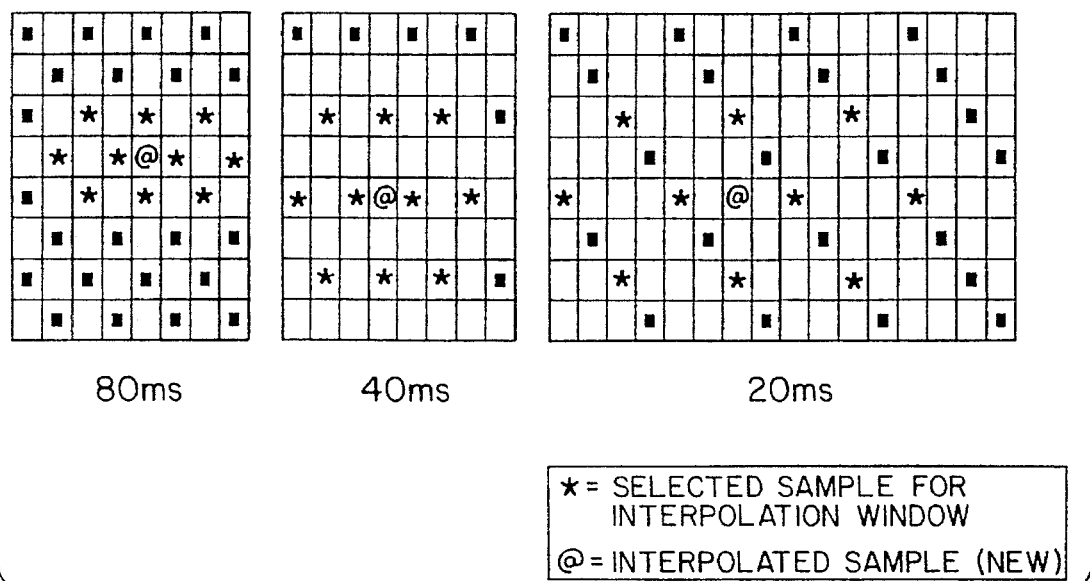
Figure 3:
Figure 4:
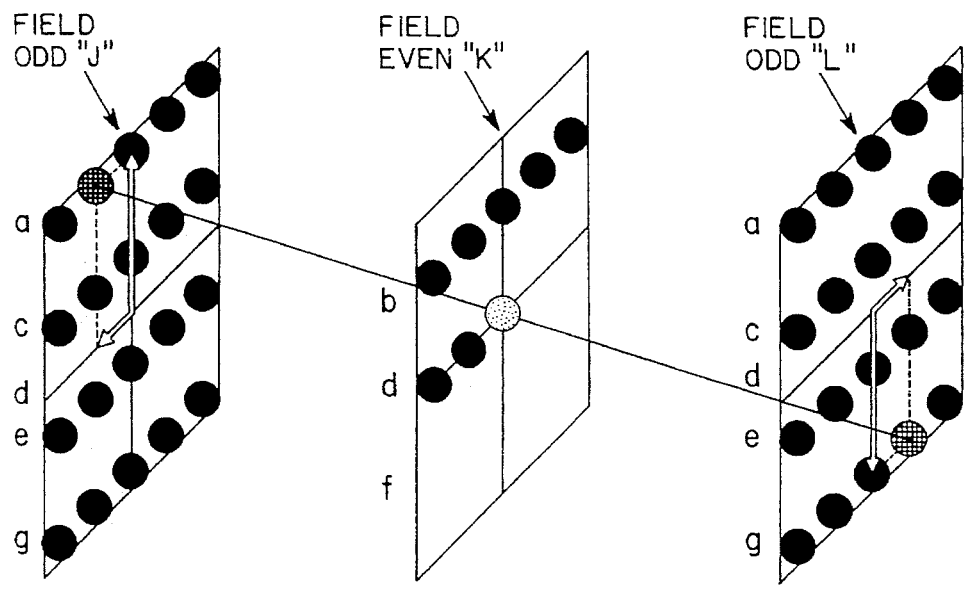
Figure 5:
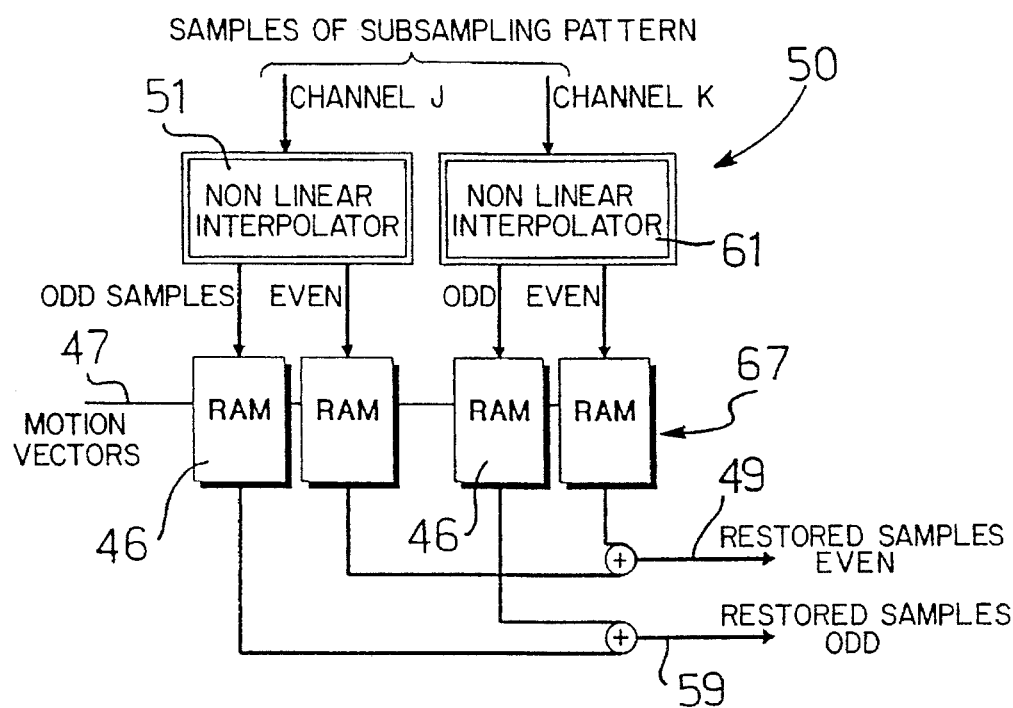
FIGS. 5 and 6 are diagramatic views of a TV signal decoder architecture according to the prior art.
Figure 6:
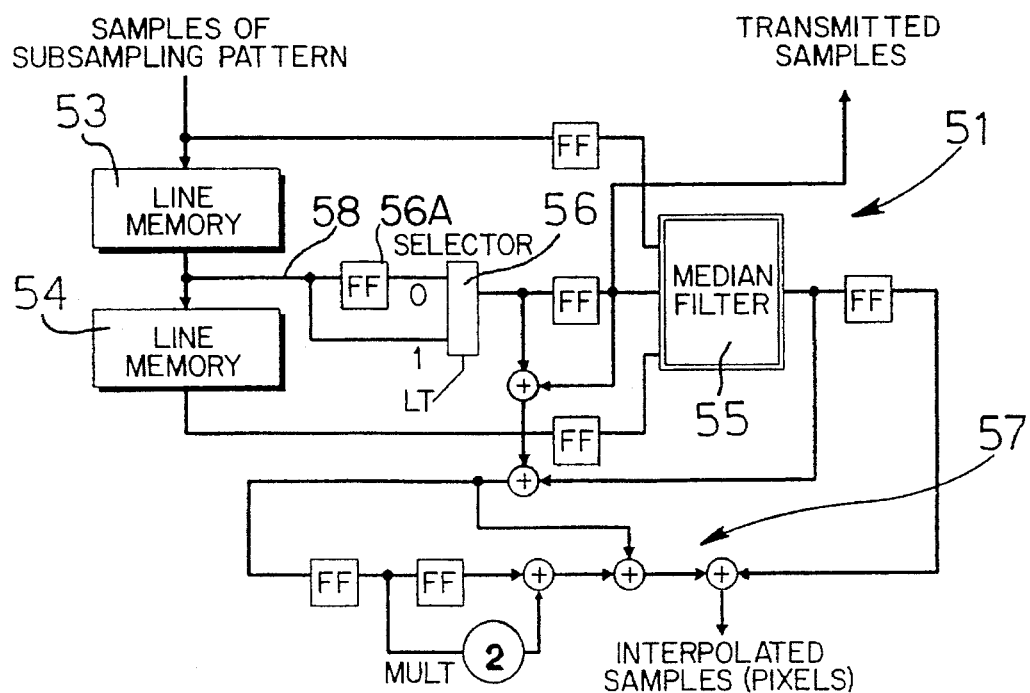
Figure 6A:
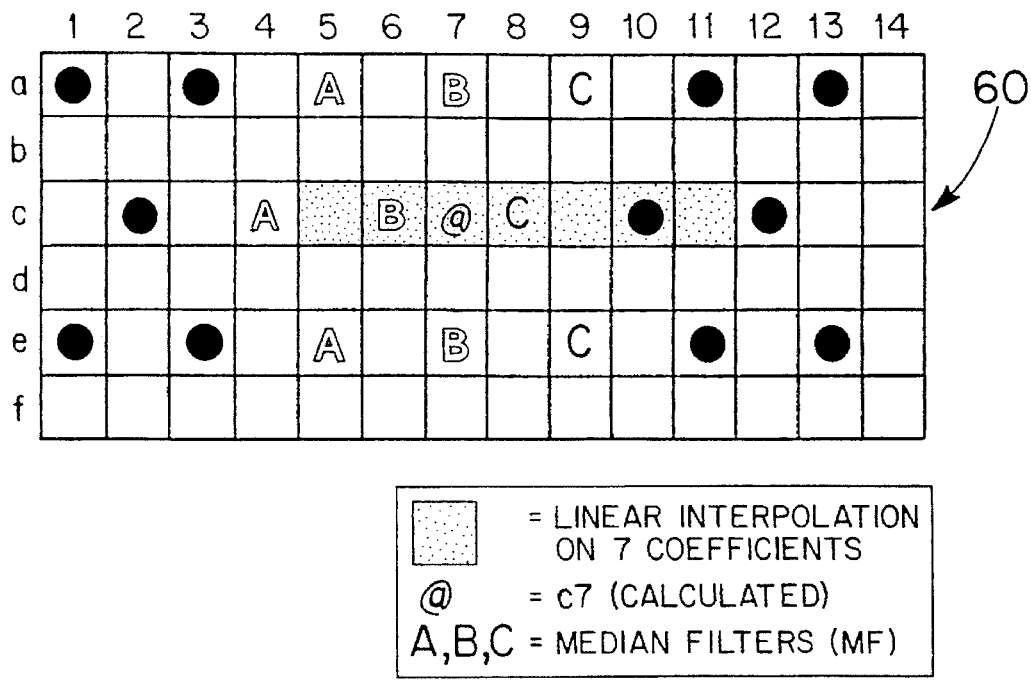
FIGS. 6a, 7 and 9 are schematic charts of further examples of algorithm processing steps according to the prior art.
Figure 7:
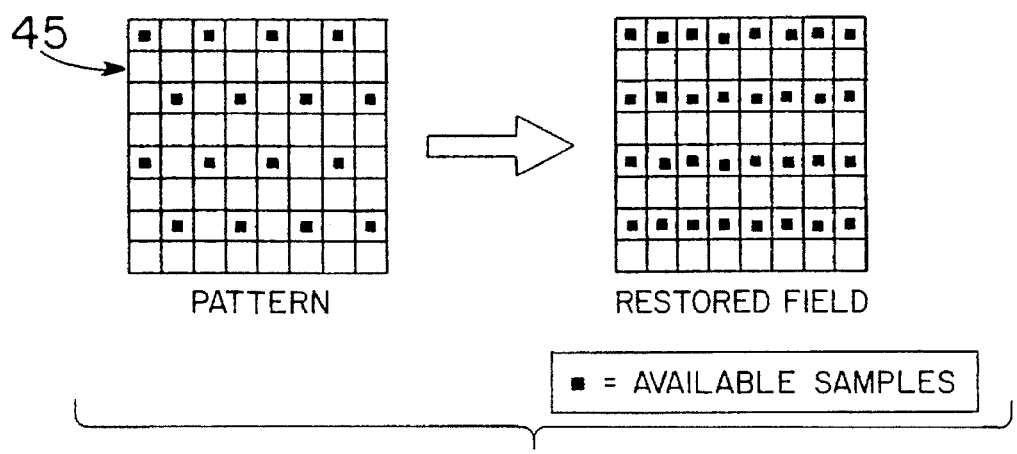
Figure 8:
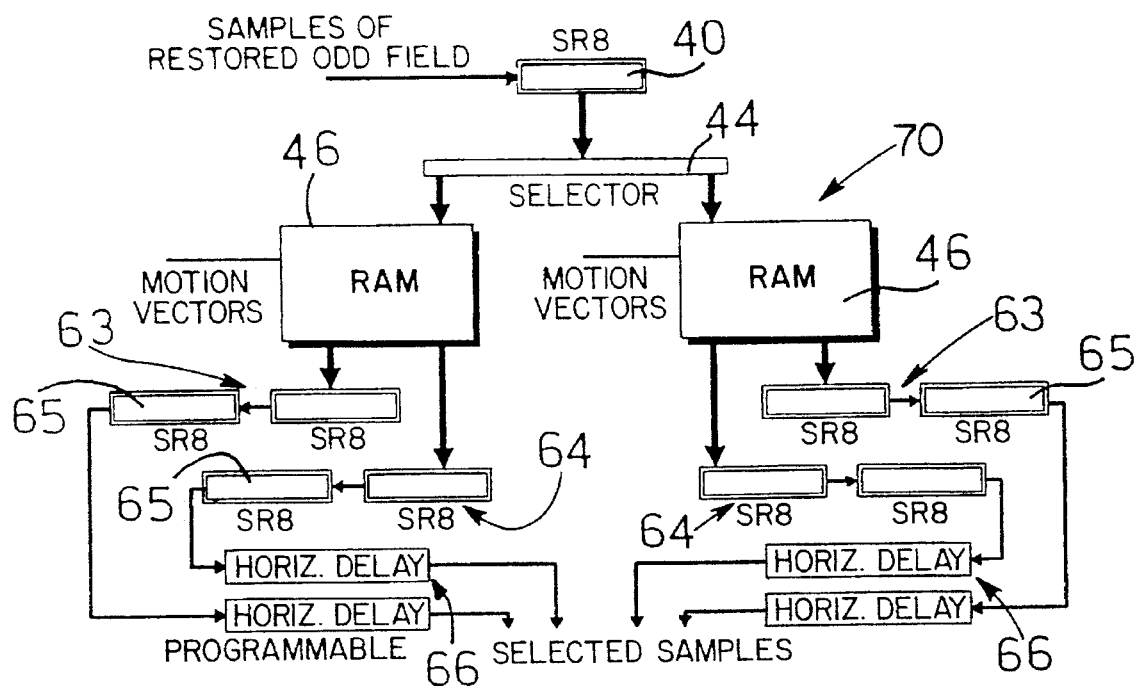
FIGS. 8 and 10 are diagramatic views of the architecture in FIG. 5 according to the prior art.
Figure 9:
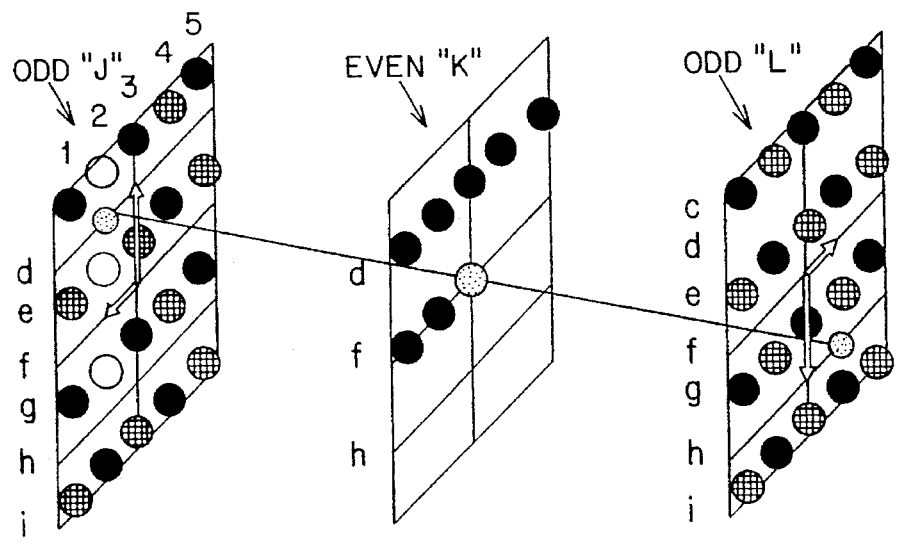
Figure 10:
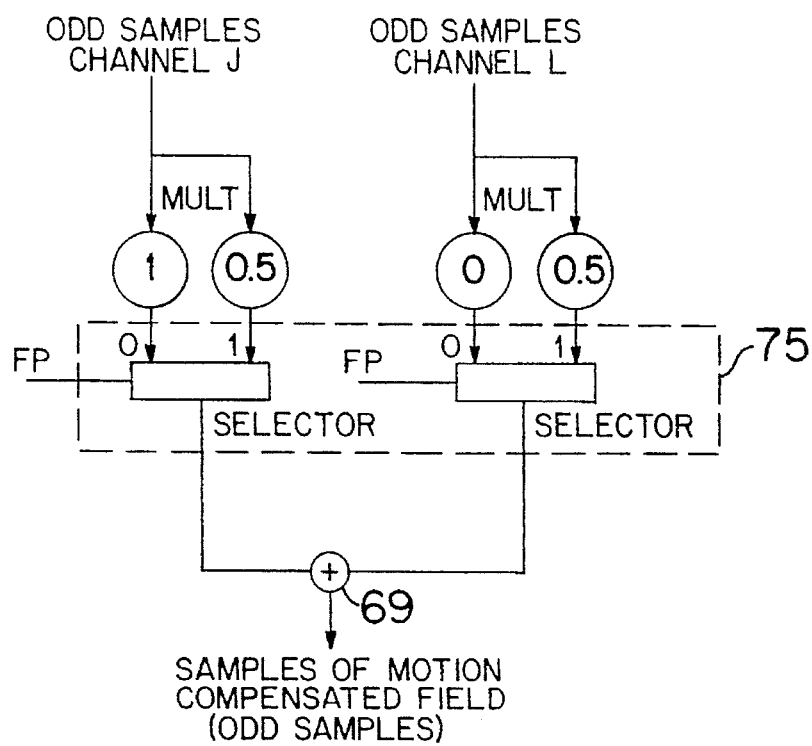

Immediately noticeable is that this working window 30 is considerably wider than the window 60 (FIG. 6A) used in the prior architecture disclosed by Thomson TCE. This increased complexity of the window 30 obviously burdens its handling hardware, but affords, as explained hereinafter, significant memory savings for the processing sections after the local memory 17.

As can be gathered from FIG. 16, the window 30 encompasses no less than five contiguous lines of the subsampling grid pattern. The sixth addressable line by the selected division into banks is needed because of the next working window 31 (FIG. 17), namely the window that appears after one clock timing (18 ns), no longer includes the first line, but includes the sixth. This alteration appears after each clock period.

Figure 17:
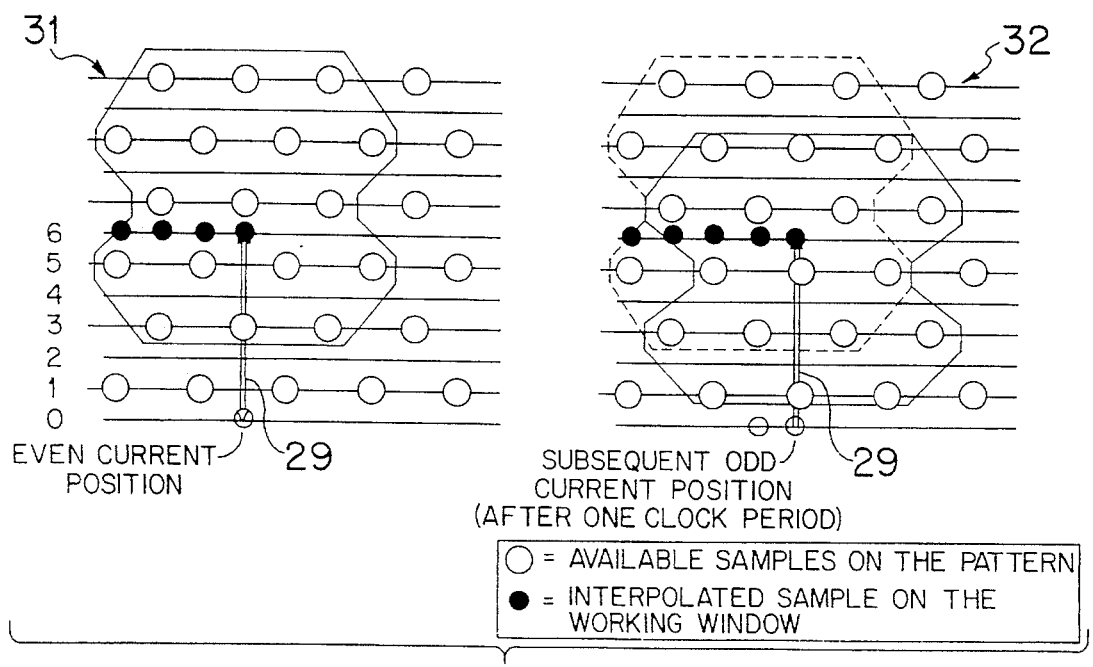

Shown in FIG. 17 are two discrete working windows 31, 32 pertaining to two successive clock timings. The location of the sample to be interpolated is at all times on the same logic line, i.e., the line to be restored, of the original image.

Figure 18:
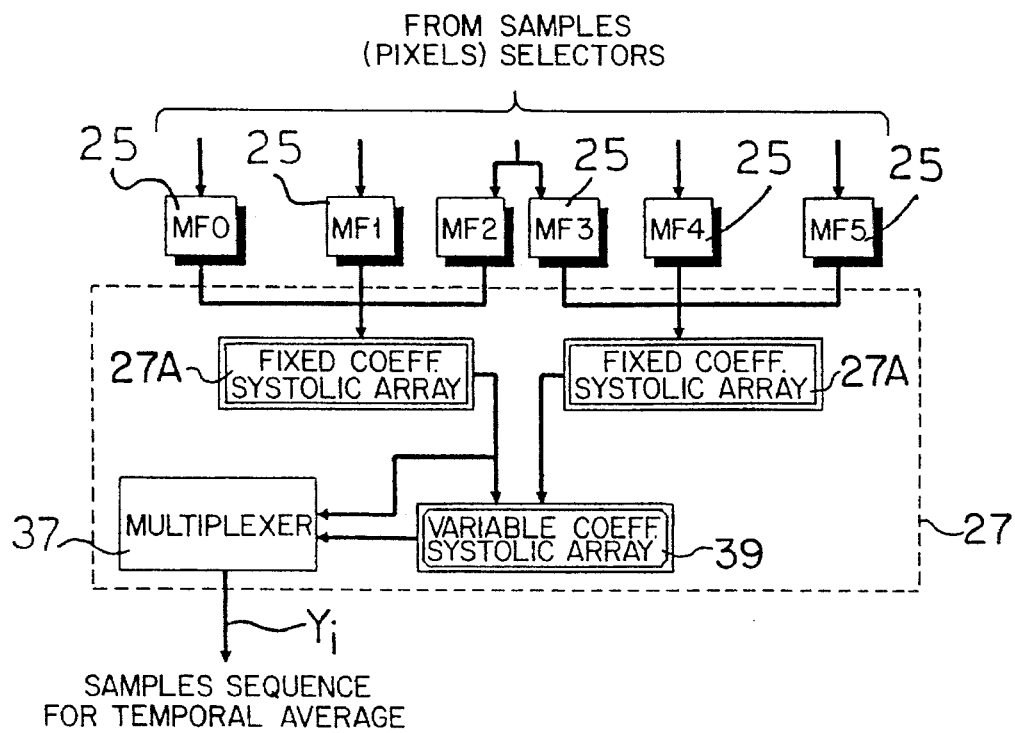
FIGS. 18, 18a, 19b and 20 to 24 are diagramatic detail views of the architecture according to the invention.

With reference now to FIG. 18, there is shown the median filter section 25 placed after the local memory 17 (previously shown in FIG. 13). The filter action is applied to the working window 30 to affect six discrete parallel averaging operations to prepare the samples Zi for the two following fixed-coefficient systolic filtering sections 27A.

Systolic filtering is performed on seven samples subsequently to the median filtering operation. Specifically, a fixed-coefficient systolic array 27A carries out the interpolation for generating a sample denoted by "M" in FIG. 16, while a second array concurrently carries out the interpolation for a sample denoted by "N". Both interpolations are needed to generate useful samples for the vertical interpolation to be later carried out on five samples of the window 30 in the same column as "M" and "N", in a similar manner to that previously explained in connection with motion compensation.

Figure 19:
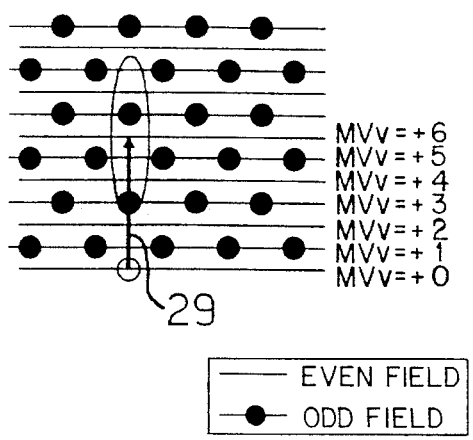
Figure 19A:
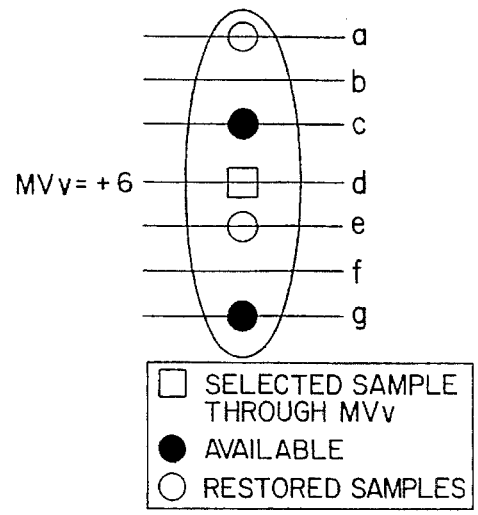

Shown diagrammatically in FIG. 19 is the vertical interpolation step. Note that, due to the alteration of the overall window of five video lines out of the six available, the vertical interpolation requires five coefficients instead of four, which means that one of them will be null. In addition, the interpolation coefficients must be shifted according to the alternation characteristic of the working window 30, as explained hereinafter in connection with the variable-coefficient systolic filtering section.

Figure 18A:
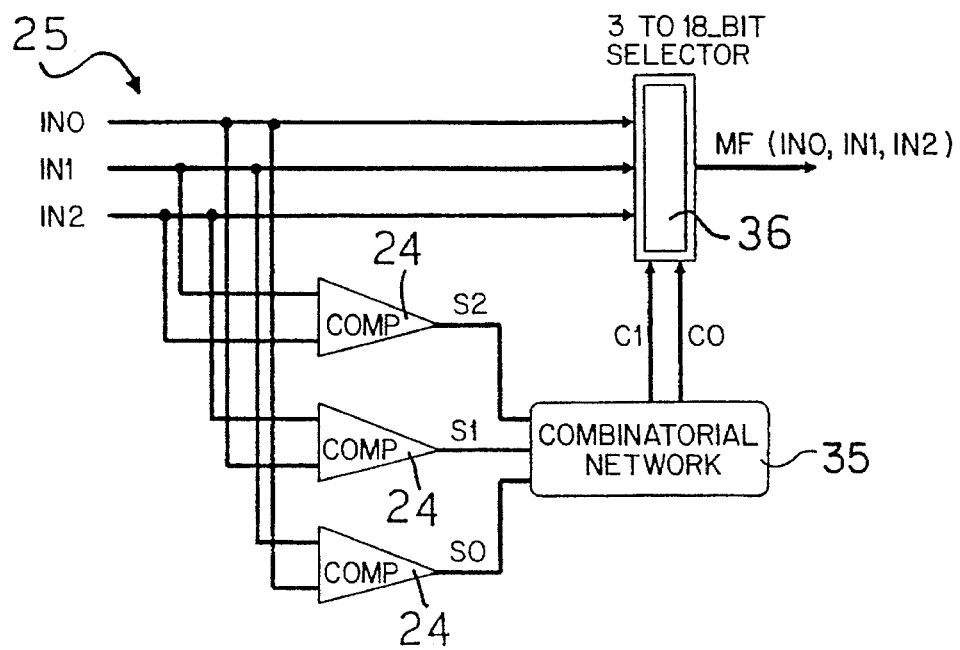
Figure 19B:
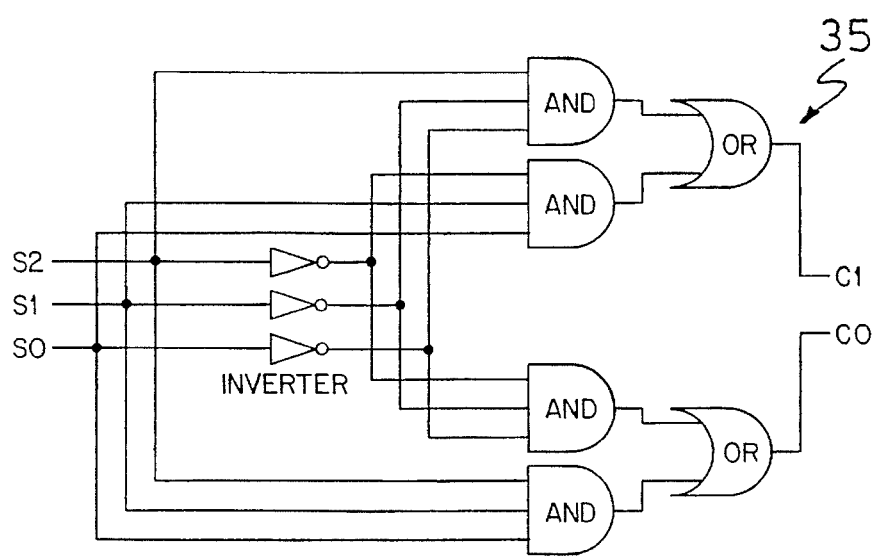

Shown in FIG. 18A is the structure implementing the median filtering block 25. Three comparators 24 carry out all of the possible comparisons between the three inputs INi of the median filter 25 (three possible comparisons) and issue on their output Si a bit having a logic value of 0 when the upper input is higher than or equal to the lower input, and of 1 when lower than that. These three output bits constitute the inputs to a combinatory network 35 which will generate two control signals C0, C1 to a selector 36 having three inputs, each of eight bits. This allows the median sample of the three input Sis to be addressed to the output. The structure of the combinatory network 35 which generates such control signals C0, C1 to the selector 36 is shown in FIG. 19b.

Figure 20:
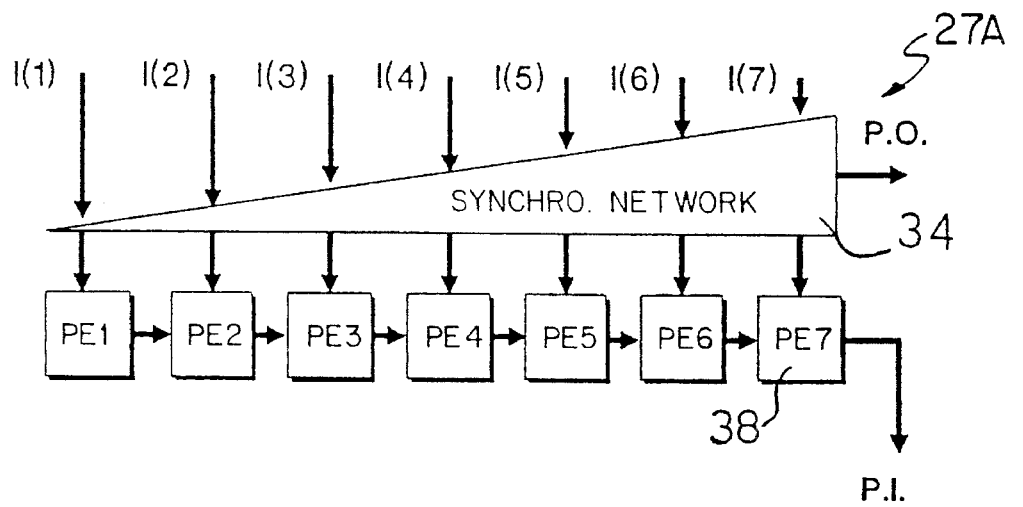

Shown in FIG. 20 is the structure 27A of the fixed-coefficient systolic array effecting the interpolation on seven samples, of which four are available and three are obtained from the median filtering operation. Each processing element PEi in the array 27A receives a suitably retarded sample I(i), so that it can be phased back to those associated with the same working window 30 and processed by the other elements, along with the sum carryover from the preceding element in the chain. A suitable timing signal, such as the 54 MHz clock signal, synchronizes the operation of each element PEi to that of the others, thereby making for a successful interpolation step.

Figure 21:
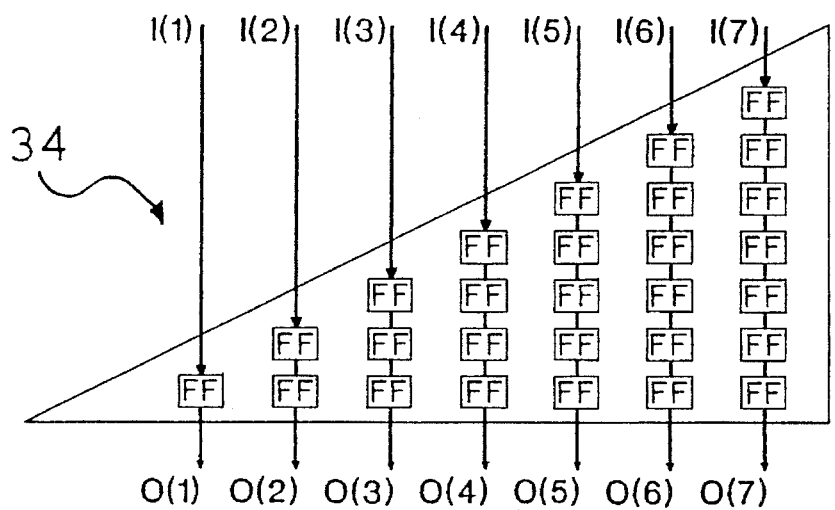

A suitable rephasing network 34 with increasing sample delays FF allows the various samples I(i) of a given interpolation window 30 to be phase added to the carryover from the preceding elements in the chain; all this being illustrated by FIG. 21.

Figure 22:
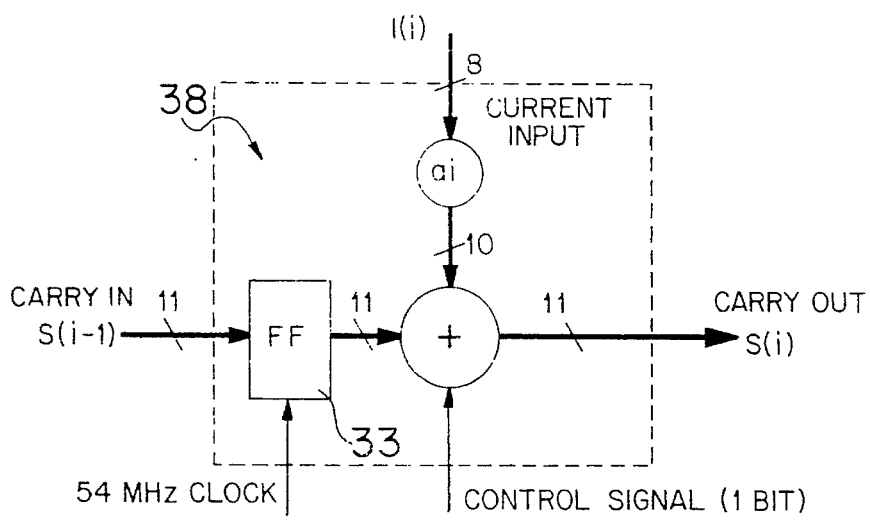

The sample I(i) being input to the element is coded with eight bits, while the result of its multiplication by the coefficient a(i) requires ten bits, and the carryover from one cell to the next requires eleven bits to adequately cover the entire dynamic range of the partial product sums. The structure of a generic processing element 38 in the fixed-coefficient systolic array 27A is shown in FIG. 22. The generic input sample I(i) is multiplied by its assigned interpolation coefficient a(i) and then added to the carryover S(i-1) from the preceding cell.

A flip-flop 33 enables the cell 38 to be synchronized to the preceding one, thereby imposing a time lag per cell which is exactly equal to the clock period and is the same for all cells 38. The result S(i) will ultimately be input to the next cell. In this way, the time lag which occurs between any of the inputs and the output of the array will be the same, thereby ensuring that the device is properly timed.

The implementation of the coefficients is quite simple and no multipliers are required. In fact, in a preferred embodiment, such coefficients are all multipliers or submultipliers of 2, or in any event amenable to sums of multiples and submultiples of 2. In this way, appropriate simple connections of the leads of the input bus on which the sample is present are enough to permit the multiplication to be effected in a most efficient and simple manner. Thus, all the coefficients needed for the interpolation can be provided.

Figure 23:
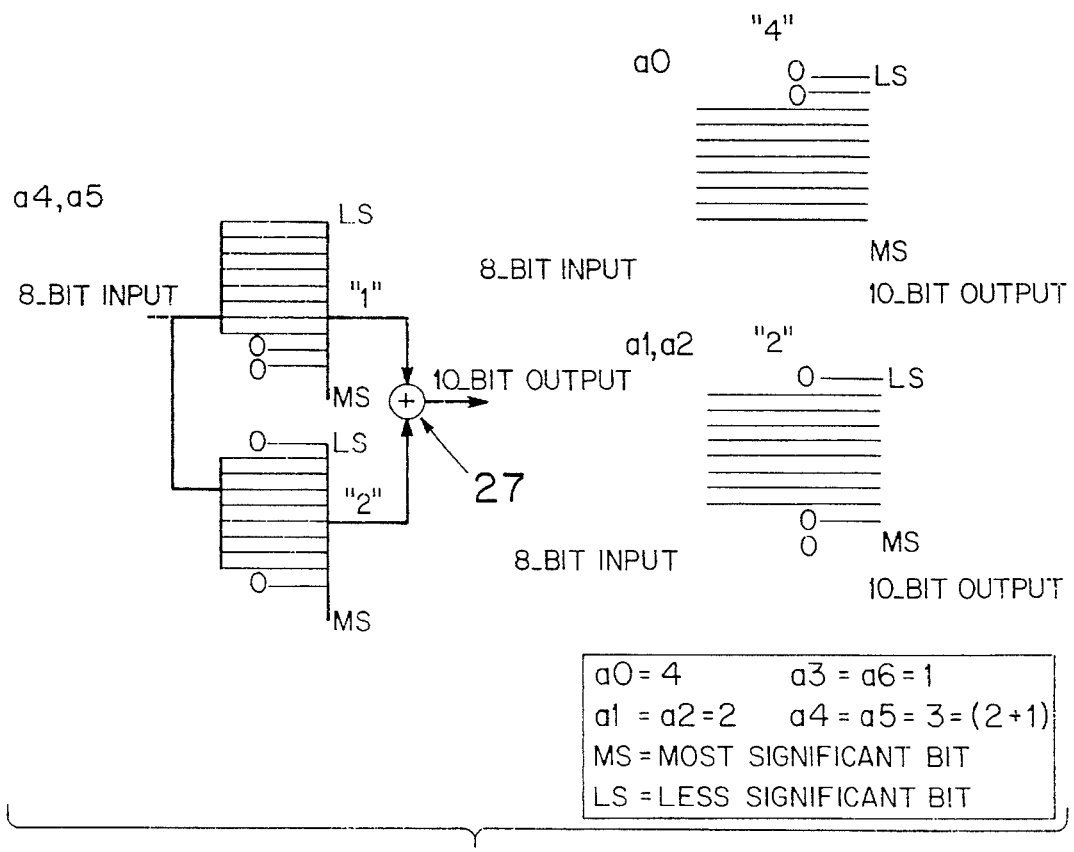

In FIG. 23, there are shown all the values required for the interpolation coefficients and respective hardware. It should be noted that all of the coefficients involved in the interpolations are amenable to multiples of 0.125 (i.e., ⅛). In this way, the (fractional) coefficients can be conveniently implemented by multiplying them by eight, to obtain integers only, and the division by eight can be performed on the end result of the interpolation, so as to avoid intermediate truncations (due to divisions) which would generate a heavy error in the ultimate computation of the interpolation formula. This division by eight is simply obtained by discarding the three least significant bits of the output bus from the last element in the chain. Output from the first fixed-coefficient systolic array are the samples of the line containing the sample "M" of FIG. 16, and from the second, the samples of the line containing "N", again at a frequency of 54 MHz.

Figure 24:
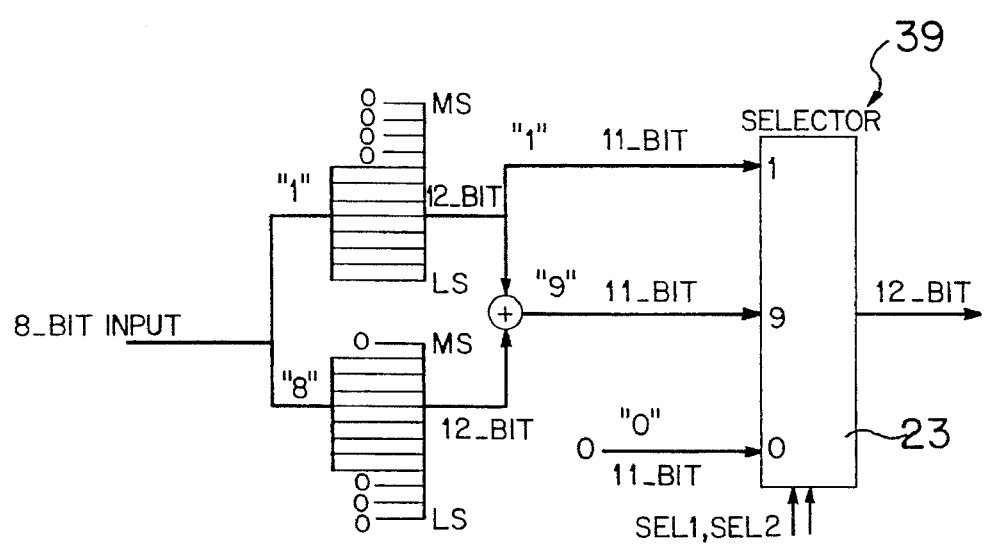

These two samples are input to a variable-coefficient systolic array 39 which will carry out the vertical interpolation (systolic filtering 27 of FIG. 13 comprises array 27A and array 39). This variable-coefficient systolic array 39 is basically a variable-coefficient systolic filter having a thoroughly similar structure to that of the filter 27A, but operating on five coefficients instead of seven and with the additional difference that the implementing structure of the various coefficients is more complex, including in particular a selector 23 for coefficient selection purposes. The various coefficient values required are shown in FIG. 24 along with their implementing architecture. At the output of this systolic filtering block 39 division by eight of the interpolation result is performed by discarding the three least significant bits of the eleven-bit bus. Then, two samples are generated, an original one from the subsampling grid pattern and another obtained by systolic interpolation. The sampling rate is 27 MHz for each output.

Figure 11:
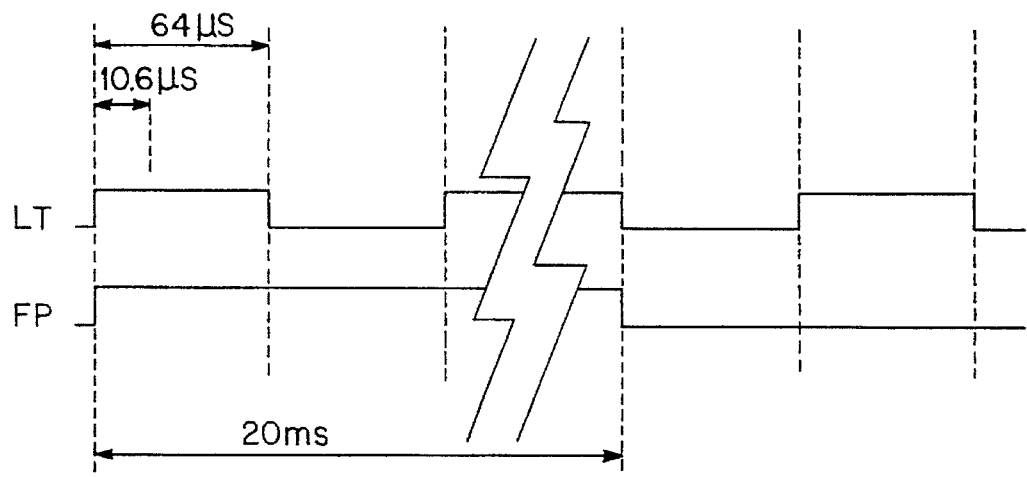
FIG. 11 shows the pattern of control signals versus time present in the architecture of FIG. 5.

Finally, a multiplexer 37 (FIG. 18) combines the two outputs into a single channel operated at a frequency of 54 MHz which represents the sequence of samples Yi related to the channel J (or L) to be conveyed to the adder 11 (FIG. 11) which will produce the time mean of the two odd fields transmitted (J and L, respectively). All these considerations equally apply to both channels J and L.

The architecture described above provides several advantages over prior approaches. First, the amount of memory required for implementation throughout its blocks is greatly reduced. In particular, the architecture disclosed by Thomson TCE uses two 720-sample memory lines to implement the non-linear interpolator (hence, four lines, since the structure is split between the channels A and C), and ten 720-sample memory lines for the motion accommodating buffer (hence, another forty lines, since there are two subchannels for the even samples and the odd samples, for each channel J and L). In all, forty four memory lines are therefore required in the Thomson TCE's architecture.

In contrast, the architecture disclosed in this Patent Application uses six banks with two 720-sample lines for each of the channels J and L, totalling twenty four memory lines.

Thus, for the architecture of this Patent Application, the raster format is not used within the system, though retaining it at the input and the output to maintain compatibility. In addition, the non-linear interpolation based on the median filter is merged with the linear interpolation for accommodating the motion, so as to reduce the number of memory lines required.

This decrease in memory lines descends directly from the following. In Thomson TCE's disclosure, lines already restored in the non-linear interpolator (hence, with 1440 samples) must be stored in order to accommodate for motion. In the present architecture, motion is accommodated along with the non-linear interpolation, using a single working window, by just storing video lines with halved horizontal resolution (720 video samples) into the local memory.

This saving in memory lines brings out great savings in the silicon area required for fabricating the chips, when it is considered that the line memories and the motion-accommodating buffer store should occupy most of the silicon physical area. The reduced number of memories affords a significant reduction in the silicon area requirements of the system as a whole, and consequently, also the possibility of integrating the entire processing portion for the 40-millisecond mode to a single chip.

Second, the structure has been expressly re-designed to maintain a sample rate of 54 MHz, thereby eliminating any duplicated processing structures and connection buses for handling even samples and odd samples, as are instead present in the prior art; consider, for instance, the duplicated motion-accommodating memory for both channels J and L.

Another advantage of this invention comes from systolic structure-based interpolating window implementation ensuring highly modular characteristics and simple re-configurability features for the interpolation step, according to the requirements of the algorithm being implemented.

The use of systolic structures allows an interpolative filtering structure to be designed which is extensively modular and easy to re-design in the event of future modifications to the form of the interpolating window or the interpolation coefficients by just changing the number or type of the processing elements in the systolic array.

Having thus described several particular embodiments of the invention, various alterations, modifications, and improvements will readily occur to those skilled in the art. Such alterations, modifications, and improvements are intended to be part of this disclosure, though not expressly stated herein, and are intended to be within the spirit and scope of the invention. Accordingly, the foregoing description is by way of example only and is not intended to be limiting. The invention is limited only as defined in the following claims and equivalents thereto.

What is claimed is:

1. A video image decoder for processing the 40-ms mode on high-resolution TV sets, of a kind handling TV signals, comprising:
   a video signal demultiplexer receiving as an input fields J and L, wherein J and L are successive odd fields of a series of fields;
   two processing blocks for separately handling the signals from each of the fields and each comprising,
   a video image format converter,
   a local memory connected to an output of the format converter, and
   at least one median filter and one systolic filter in cascade connection after said memory for restoring, by interpolation, signal samples related to successive lines of the video image so as to provide an output of the processing block; and
   a summing node for adding together the outputs from each processing block so as to obtain a time mean between restored samples of the fields J and L.

2. The decoder according to claim 1, wherein said local memory comprises individually addressable memory banks to store all the samples of a predetermined video line into a given bank.

3. The decoder according to claim 2, wherein the word length of each memory bank is of sixty four bits.

4. The decoder according to claim 1, wherein said format converter comprises a demultiplexer having plural outputs so as to supply, after one another, corresponding plural banks of said local memory with signal samples from the corresponding processing block.

5. The decoder according to claim 4, wherein the selection of the various banks is driven through a counter which is incremented by shifts of a synchronization signal.

6. The decoder according to claim 2, wherein each memory bank is formed of two dual port RAM stores where write and read operations are performed alternately, one RAM store containing odd-located samples of a given video line and the other RAM store containing even-located samples.

7. The decoder according to claim 1, wherein said median filter comprises a selector and comparators, all connected to the output of a combinatory network operative to generate at least a pair of control signals to the selector for selecting a median sample from the input of said median filter to a filter output.

8. The decoder according to claim 1, wherein said systolic filter comprises an array of elements in a chain connection each receiving a suitably delayed signal sample for phasing the signals to a working window and a sum carry-over from a preceding element in the chain connection, said systolic filter further comprising a phasing network having increasing sample time lags for enabling the various samples of a predetermined interpolating window to be summed in phase with the carry-over from the preceding elements in the chain.

9. The decoder according to claim 8, wherein the systolic filter includes a generic processing element having an interpolation coefficient multiplier, an adder connected after the multiplier, and a storage cell connected to the adder for transferring the carry-over from a preceding element in the chain.

10. The decoder according to claim 8, characterized in that a working frequency of each processing block is set at no less than 54 MHz.

11. A video image decoder for processing the 40-ms mode of a TV signal of HDMAC format, comprising:
    a demultiplexer for demultiplexing said TV signals into an J field and a L field, wherein the J field and the L field are successive odd fields;
    a first and second processing block, the first processing block receiving the J field and the second processing block receiving the L field, each processing block including
    an image format converter for receiving a respective field and providing formatted output therefrom;
    memory means for receiving and storing the formatted output,
    median filter means for concurrently providing a first plurality of median values based upon a received second plurality of inputs which are selected from the memory means in accordance with a working window of interpolation, and
    systolic filtering means for producing a restored output of the respective field, said systolic filtering means receiving the first plurality of median values and receiving a third plurality of inputs selected from the memory means in accordance with the working window, the systolic filtering means including means for concurrently interpolating missing horizontal samples of at least two lines of the respective field and including means for interpolating missing vertical samples of the respective field in accordance with a motion vector of the TV signal; and output means for producing a time mean of the restored outputs, said output means outputting the restored outputs and the time mean.

12. The decoder of claim 11, wherein the memory means comprises a plurality of banks, each bank storing all received samples of a corresponding horizontal line of the respective field.

13. The decoder of claim 12, wherein the plurality equals 6 and wherein the working window spans a width of 5 horizontal lines.

14. The decoder of claim 12, wherein each bank is interleaved such that odd columned samples of a corresponding line are stored in a first RAM store and even columned samples are stored in a second RAM store.

15. The decoder of claim 11, wherein the systolic filtering means for concurrently interpolating missing horizontal samples comprises a first fixed coefficient array and a second fixed coefficient array, each fixed coefficient array interpolating a missing sample of a corresponding line of the respective fields.

16. The decoder of claim 15, wherein the means for interpolating missing vertical samples comprises a variable coefficient array connected to the first and second fixed coefficient array.

17. The decoder of claim 16, wherein the variable coefficient array includes a selectable number of coefficients for interpolation, the selection of said coefficients being responsive to the first and second fixed coefficient arrays.

18. The decoder of claim 14 wherein the first and second RAM store each have a capacity of 90 words, a word being 8 samples.

19. The decoder of claim 11 wherein each processing block has a working frequency of 54 MHz.

20. A video image decoder for processing the 40-ms mode of a TV signals of HDMAC format, comprising:

a demultiplexer for demultiplexing said TV signals into an J field and a L field, wherein the J field and the L field are successive odd fields;

a first and second processing block, the first processing block receiving the J field and the second processing block receiving the L field, each processing block including an image format converter for receiving a respective field and providing formatted output therefrom memory for receiving and storing the formatted output, median filter for concurrently providing a first plurality of median values based upon a received second plurality of inputs which are selected from the memory in accordance with a working window of interpolation, and systolic filter for producing a restored output of the respective field, the systolic filter receiving the first plurality of median values and receiving a third plurality of inputs selected from the memory in accordance with the working window, the systolic filter including a horizontal interpolater for concurrently interpolating missing horizontal samples of at least two lines of the respective field and including a vertical interpolater for interpolating missing vertical samples of the respective field in accordance with a motion vector of the TV signal; and output node for producing a time mean of the restored outputs, said output node outputting the restored outputs and the time mean.

21. The decoder of claim 20, wherein the memory comprises a plurality of banks, each bank storing all received samples of a corresponding horizontal line of the respective field.

22. The decoder of claim 21, wherein the plurality equals 6 and wherein the working window spans a width of 5 horizontal lines.

23. The decoder of claim 21, wherein each bank is interleaved such that odd columned samples of a corresponding line are stored in a first RAM store and even columned samples are stored in a second RAM store.

24. The decoder of claim 20, wherein the systolic filter includes a first fixed coefficient array and a second fixed coefficient array, each fixed coefficient array interpolating a missing sample of a corresponding line of the respective fields.

25. The decoder of claim 24, wherein the vertical interpolator includes a variable coefficient array connected to the first and second fixed coefficient array.

26. The decoder of claim 25, wherein the variable coefficient array includes a selectable number of coefficients for interpolation, the selection of said coefficients being responsive to the first and second fixed coefficient arrays.

27. The decoder of claim 23 wherein the first and second RAM store each have a capacity of 90 words, a word being 8 samples.

28. The decoder of claim 20 wherein each processing block has a working frequency of 54 MHz.

* * * * *